Aug. 25, 1942.   A. B. CADMAN   2,293,710
BRAKE
Filed Dec. 16, 1939   2 Sheets-Sheet 1
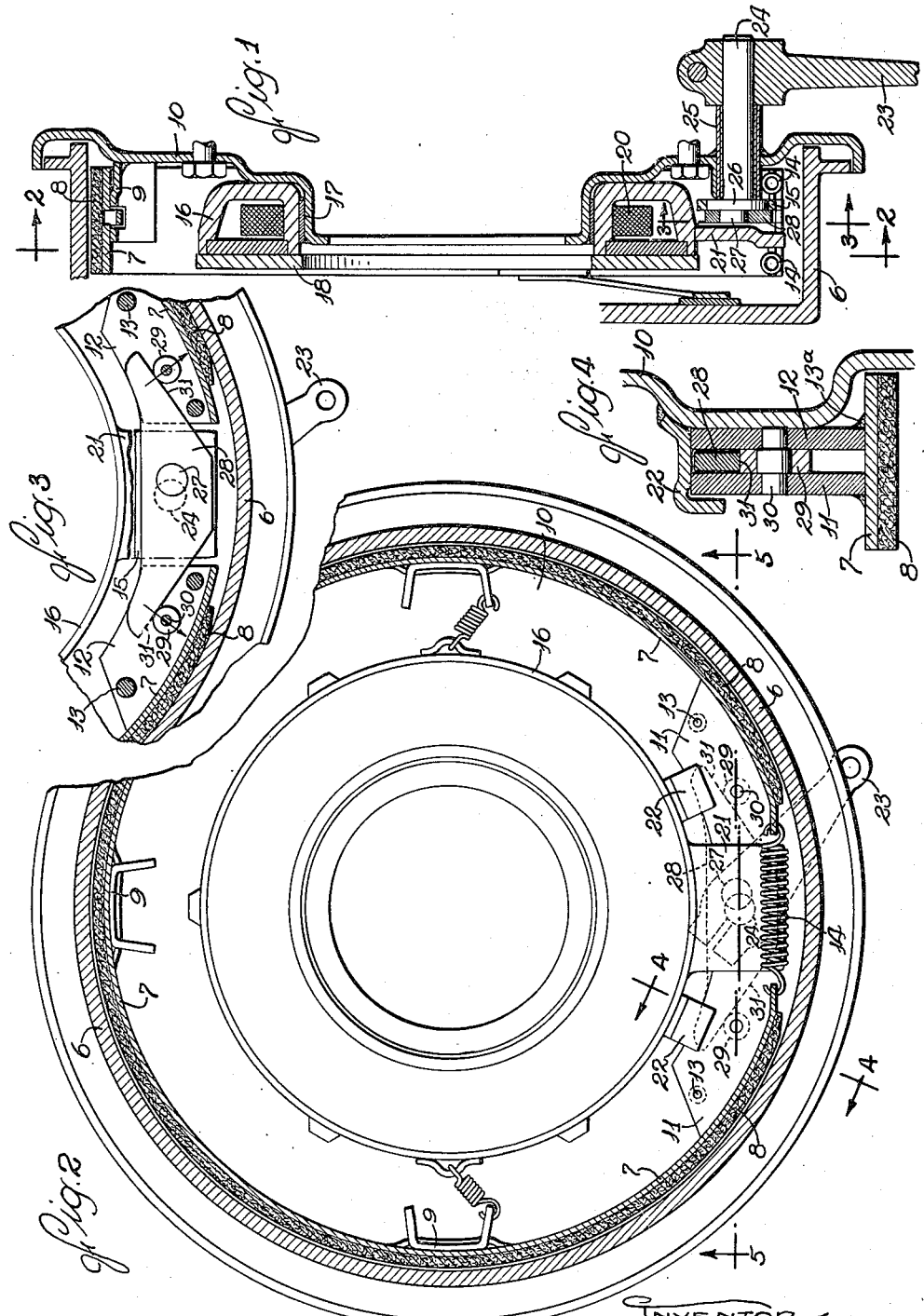
INVENTOR
Addi B. Cadman
By Parker, Carlson, Pitzner & Hubbard
ATTORNEYS

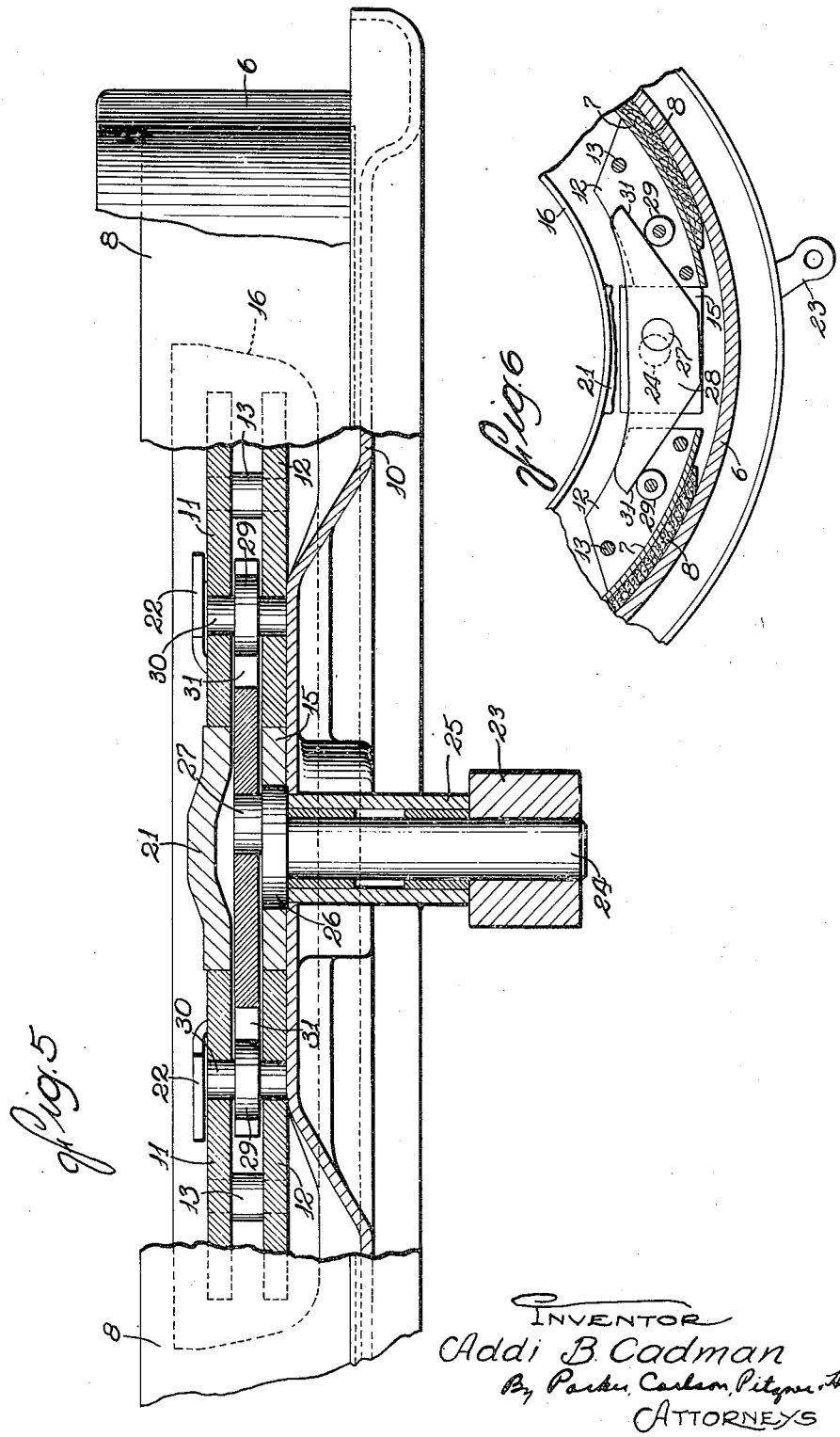

Patented Aug. 25, 1942

2,293,710

UNITED STATES PATENT OFFICE 2,293,710

BRAKE

Addi B. Cadman, Beloit, Wis., assignor to Warner Electric Brake Manufacturing Company, South Beloit, Ill., a corporation of Illinois Application December 16, 1939, Serial No. 309,539

3 Claims. (Cl. 188—78)

This invention relates generally to friction brakes of the character used on automotive vehicles, and more particularly to a brake of the type in which a wrapping or self-energizing action is created when the brake is applied.

One object of the invention is to provide a brake of the above general character having a novel means for applying the actuating pressure so that the wrapping action may build up properly throughout the entire length of the braking element.

The invention also resides in the novel character of the pressure applying mechanism and the construction thereof which permits the brake to be actuated by more than one operator and with the rotatable brake element turning in either direction.

Other objects and advantages of the invention will become apparent from the following detailed description taken in connection with the accompanying drawings, in which—

Figure 1 is a diametrical sectional view of a brake embodying the features of the present invention.

Figs. 2 and 3 are fragmentary sectional views taken respectively along the lines 2—2 and 3—3 of Fig. 1 and showing different positions of the parts.

Figs. 4 and 5 are sections taken along the lines 4—4 and 5—5 of Fig. 2.

Fig. 6 is a view similar to Fig. 3 showing a different position of the parts.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

For purposes of illustration, the drawings show the invention embodied in a vehicle brake of the internal expanding type having a rotatable friction element in the form of a rotatable drum 6 coacting with a non-rotatable braking member of the band type comprising a flexible strip 7 of metal to which are riveted or otherwise secured segments 8 of suitable friction material. The band encircles and is supported for longitudinal movement by means including lugs 9 on a non-rotatable anchor plate 10 which closes the open end of the drum. In the present instance, the band encircles the entire internal cylindrical surface of the drum with its ends disposed adjacent each other and each carrying a bracket comprising two upstanding plates 11 and 12 connected by spacer studs 13 and made rigid with the band as by welding 13ª. Contractile springs 14, stretched between the band ends, normally maintain the plates 12 in abutment with opposite sides of a stop 15 welded against the inner surface of the anchor plate 10 and projecting inwardly therefrom.

The brake illustrated is adapted to be applied by either of two independently operable actuators. One of these is a power operator of the momentum type comprising an annular magnet ring 16 mounted to oscillate on a bearing 17 on the anchor plate 10 and held in proper axial position by lugs 22 rigid with the anchor plate and projecting across the plates 11 and 12 and then laterally alongside the plate 11. The magnet coacts with an armature ring 18 rotatable with the drum and supported for yielding axial movement by the inturned flange of the drum. A lug 21 rigid with and projecting radially from the outer periphery of the magnet is disposed between the opposed ends of the plates 11 and abuts these ends in the released positions of the parts. When the magnet winding 20 is energized, the magnet will grip the armature and turn therewith. This movement is communicated through the medium of the lug 21 and one of the plates 11 to one end of the band depending on the direction of movement of the magnet as determined by the direction of rotation of the drum. This results in expansion of the band and the initiation of a self-energizing action that creates a powerful braking effect. After clearance between the band and drum have been taken up, slippage occurs between the magnet and armature, the brake being held set so long as the magnet remains energized. When the magnet is deenergized, the springs 14 restore the band and the magnet to the normal brake-released position.

The present invention is concerned more particularly with the auxiliary or manually operable actuator which is combined compactly with the power operator. This actuator is rendered operative by oscillation of a crank arm 23 fast on a rockshaft 24 which is journaled in a sleeve 25 rigid with and projecting through the anchor plate and a hole in the stop 15. A disk 26, fast on the inner end of the rockshaft, carries an eccentric pin 27 which projects into a hole at the longitudinal center of a plate 28 disposed between and guided by the plates 11 and 12 for bodily edgewise movement toward and away from the internal drum surface. The ends of the plate 28 project beyond and lie inside of rollers 29 on studs 30 extending between the band plates. These rollers coact with cam surfaces 31 on the plate 28 converging outwardly and toward the plate center.

When the crank 23 is in released position, the eccentric 27 is inside of the shaft axis as shown in Fig. 2 and the cam plate 28 is centered longitudinally with respect to the follower rollers 29 thus permitting the band ends to be drawn into abutment with the stop 15. The brake is then released. When the crank is moved from the position shown in Fig. 2 to that of Fig. 3, the plate 28 is shifted outward bodily in an edgewise direction thereby pressing both band ends against the internal drum surface, the band ends being separated slightly as shown in Fig. 3 due to the inclination of the surfaces 31. The resultant forces thus applied to the band ends will be normal to the cam surfaces 31 as shown by the arrows in Fig. 3 and thus will have not only radial components pressing the shoes against the drum, but also circumferential components directed away from the band stop and tending to separate the band ends and thereby expand the band. As a result, the actuating force is effective in producing the required braking action in spite of the fact that the actuating member is moved radially for convenience of actuation and compactness of its association with the main actuator. While the surfaces 31 are straight in the present instance, it will be obvious that they might be curved or otherwise shaped to produce similarly directed resultant forces.

If the drum is stationary at the time the lever 13 is actuated, the parts will remain in the position shown in Fig. 3. If, however, the drum is rotating, for example, in a clockwise direction, when the cam plate is actuated or moves in this direction after such actuation, the band will, due to the gripping engagement of the band and drum, shift circumferentially with the drum until the leading end engages the stop 15. As an incident to this, the right hand end of the cam plate will shift inwardly as shown in Fig. 6 and the other end will move outwardly a distance determined by the extent of movement of the trailing band end away from the stop 15. As a result, a self-energizing or wrapping action is developed producing a braking effect proportional to the pressure applied to the crank 23. The building up of this wrapping effect is augmented materially through the use of the cam surfaces 31 inclined as above described. The brake releases automatically when the actuating force is released and the eccentric 27 permitted to return to the position shown in Fig. 2.

The cam plate 28 and the associated parts afford a simple and effective auxiliary actuator for a brake of the character disclosed. It is arranged compactly with the parts of the main or power operator and does not interfere with the normal operation thereof.

I claim as my invention:

1. A friction brake having, in combination, a rotatable drum, a friction band extending around the internal drum surface with its ends disposed adjacent each other, spaced plates disposed in the plane of the band and carried by said ends on the inner sides thereof, a fixed stop disposed between two of the plates to anchor one end or the other of the band, an actuating member disposed between the other plates and movable circumferentially to move one or the other of the plates away from said stop and thereby expand said band, a second member disposed between said plates with its ends overlying and bearing against said band ends, and actuating means for shifting said second member outward bodily to press both of said band ends against said drum surface.

2. A friction brake having, in combination, a rotatable drum, a friction element extending around the internal drum surface with its ends disposed adjacent each other, a fixed stop disposed between said ends to anchor one or the other of the ends when said element is expanded against the rotating drum, an actuating member disposed between said ends and movable circumferentially to move one or the other of the ends away from said stop and thereby expand said band, a second actuating member overlying and bearing against said ends and mounted for bodily radial movement, and actuating means for shifting said member to press both of said ends against said drum surface.

3. A friction brake having, in combination, a rotatable drum, an anchor plate closing said drum, a friction element supported by said anchor plate and extending around the internal surface of said drum with its ends disposed adjacent each other on one side of the drum, a pair of spaced longitudinal ribs on each of said shoe ends, a stop fixed to and rigid with said anchor plate and disposed between said ends and in abutment with the ends of said ribs, a member mounted along side said stop with its ends projecting between the ribs of said pairs and carrying cam surfaces bearing against said ends, said member being movable edgewise to press the ends against said drum, a rockshaft projecting outwardly from said anchor plate, and actuating means carried by said rockshaft and operable to shift said member bodily toward and away from said drum surface in the movements of said shaft in opposite directions.

ADDI B. CADMAN.